United States Patent [19]

Tiedt

[11] 4,229,665
[45] Oct. 21, 1980

[54] PROGRAMMABLE POWER SUPPLY SYSTEM

[75] Inventor: Larry M. Tiedt, Glendale Heights, Ill.

[73] Assignee: GTE Automatic Electric Laboratories Incorporated, Northlake, Ill.

[21] Appl. No.: 944,826

[22] Filed: Sep. 22, 1978

[51] Int. Cl.³ .............................................. H02J 7/00
[52] U.S. Cl. .................................... 307/150; 364/492
[58] Field of Search ............ 179/1 SW; 307/149–150, 307/154; 363/24; 364/492

[56] References Cited
PUBLICATIONS

*A User's Handbook of D/A and A/D Converters,* Eugene R. Hnatek, John Wiley & Sons, New York, Jun. 1976, p. 192 and 277.

*Primary Examiner*—William M. Shoop
*Attorney, Agent, or Firm*—Robert J. Black; Gregory G. Hendricks

[57] ABSTRACT

A programmable power supply system which supplies all of the power requirements of a telephone subscriber's loop circuit in a digital telephone switching system. An associated processing unit generates digital control signals to select a particular power supply which generates power, of a particular magnitude in response to the control signals and applies same to a telephone subscriber's loop circuit.

10 Claims, 4 Drawing Figures

PROGRAMMABLE POWER SUPPLY SYSTEM

BACKGROUND OF THE INVENTION (1) Field of the Invention

The present invention relates to telephone subscriber loop power supplies and more particularly to a program controlled system which supplies all of the loop circuit power requirements.

(2) Description of the Prior Art

Telephone subscriber loop circuits require a wide variety of control voltages, for such functions as talking battery, ringing, coin collect, coin return, etc. Typical voltages for these functions are −50 V, 88 V @20 Hz superimposed on 40 V, +130 V and −130 V.

In conventional analog systems these voltages are switched through the network from service circuits specially designed to provide these functions. This technique is generally not possible with a digital network because the relatively high voltages involved cannot be passed through the network. It is possible to use an analog serice network completely separate from the digital network but this approach is not economical for small remote digital offices.

Another solution has been to apply these voltages at the line card. It is not practical to employ a single line card to switch in all of the required voltages since not all lines require all voltages, the approach has been to use different line circuits for different applications. This requires a multiplicity of different line circuits which is not an economical solution in terms of both initial cost and maintenance.

The present invention solves this problem by using small low-cost digitally programmable power supplies associated with each line to supply all of the power requirements of the subscriber's loop circuit.

Accordingly, it is the object of this invention to provide an economical solution to the problem of supplying subscriber loop circuit power requirements without the need for specialized line circuits, service circuits or analog networks.

SUMMARY OF THE INVENTION

The present invention is a circuit which controls the application of power to the telephone subscriber loop circuits in a digital switching system. This circuit is connected between a central or peripheral processing unit and each telephone subscriber's loop circuit so that the processing unit can control the application of power to each telephone subscriber's loop circuit by transmitting digital data representative of desired power levels to a selected programmable power supply.

The programmable power supply system includes a clock circuit connected to an address counter. Each programmable power supply includes a gating circuit connected to a presettable counter, both of which are connected to a power switching circuit. The presettable counter is also connected to a processing unit and a clock circuit, and the gating circuit is connected to the address counter. The power switching circuit is connected to the loop circuit and includes a flip-flop circuit connected to a high voltage interface circuit which is connected to two high voltage switching transistors, each of which are connected to an L-C filter circuit.

The gating circuit in each individual programmable power supply generates an enable signal in response to a unique combination of address signals from the address counter. Digital data representative of a desired power level is stored in the presettable counter by the processing unit while the enable signal is active. The enable signal causes the power switching circuit to apply a first characteristic of power to the filter circuit. The counter then counts down to a reset position and generates a reset signal which causes the power switching circuit to apply a second characteristic of power to the filter circuit. The filter circuit then applies the average of these power characteristics to the telecommunication loop circuit.

Once the processing unit loads the presettable counter, power representative of that data will be applied to the loop circuit until the register is loaded with different data. In this way, DC power can be applied until the register is reloaded and AC power can be applied by frequently changing the data in the register.

DESCRIPTION OF THE PREFERRED EMBODIMENTS

Figure 1:
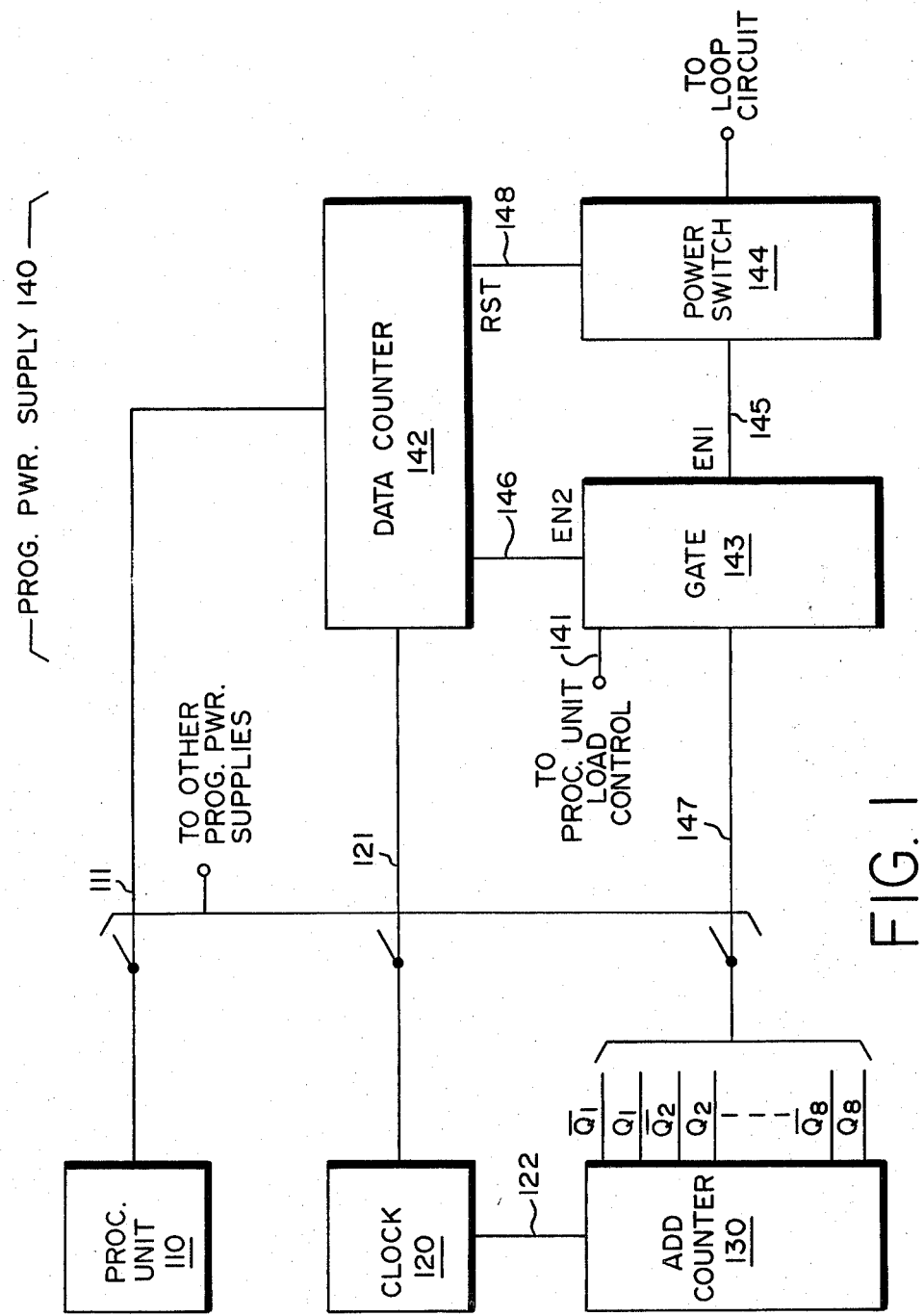
FIG. 1 is a schematic circuit diagram of a programmable power supply system in accordance with the present invention.

Referring now to FIG. 1, the programmable power supply system is shown connected to a loop circuit and a processing unit 110. The programmable power supply system includes a clock circuit 120 connected to a plurality of programmable power supplies including 140.

Programmable power supply 140 consists of presettable electronic counter 142 connected to processing unit 110 and clock circuit 120. Gate 143 is connected to address counter 130, presettable counter 142 and power switch 144 which is connected to the loop circuit.

Figure 2:
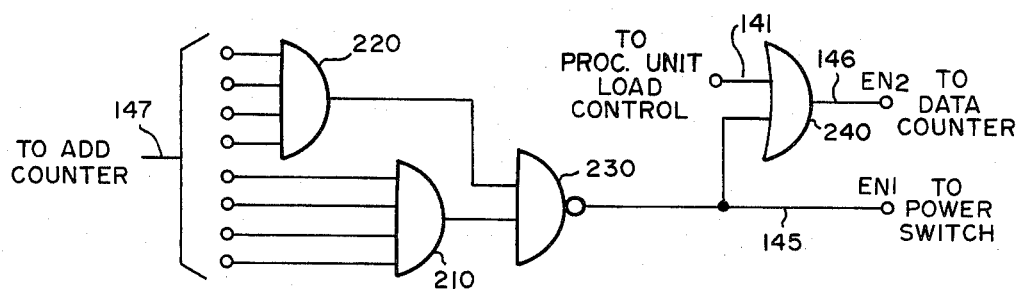
FIG. 2 is a schematic circuit diagram of the gate circuit of FIG. 1.

Clock circuit 120 drives address counter 130 which generates address signals for programmable power supplies 140. Gate circuit 143 of each programmable power supply is connected to address counter 130 via connections 147. The detailed circuitry of gate circuit 143 is shown in FIG. 2. A unique combination of the address signals, on eight of these connections 147, is decoded by gates 210, 220, and 230 as shown in FIG. 2. Upon decoding its unique address, gate 230 generates enable signal EN1 on lead 145. Gate 240 responds to enable signal EN1 by generating enable signal EN2 on lead 146. Presettable counter 142 is enabled by signal EN2 to allow processing unit 110 to transfer data representative of a new desired power level to presettable counter 142 when the processing unit 110 generates the load control signal on lead 141.

Figure 3:
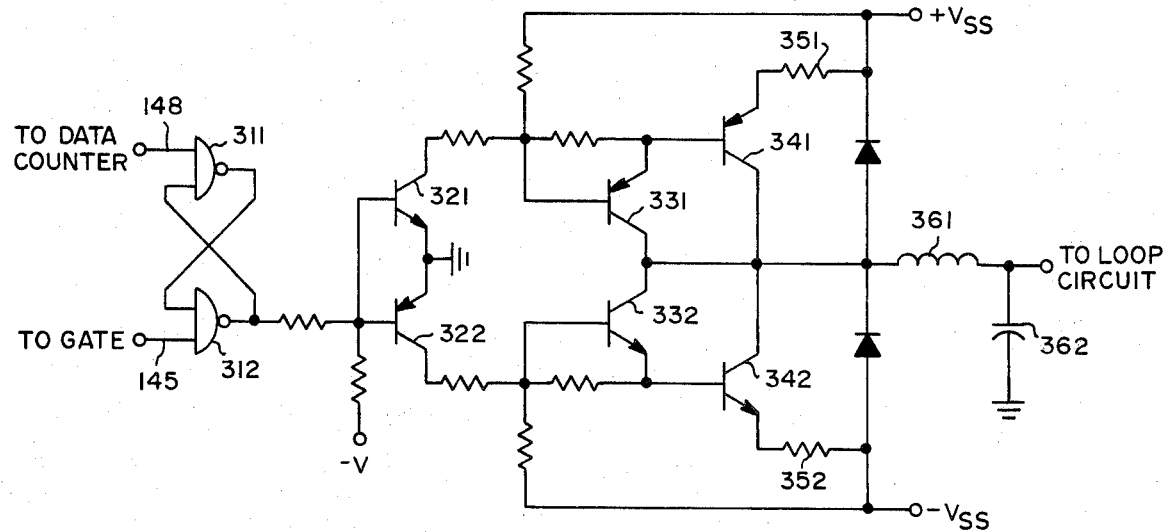
FIG. 3 is a schematic circuit diagram of the power switching circuit of FIG. 1 which provides for passive current limiting.

Power switch 144 responds to enable signal EN1 by applying a first polarity of power to choke 361, as shown in FIG. 3. When presettable counter 142 counts down to its reset position, in response to clock pulses on lead 121 and the initial count transferred from Processing Unit 110, it generates a reset signal RST on lead 148. Power switch 144 responds to reset signal RST by applying a second polarity of power to choke 361. A filter circuit comprising choke 361 and capacitor 362 then applies power equal in magnitude to the average of the duration of these two polarities of power to the loop circuit.

The period of the address counter 130 is such that a given programmable power supply will be re-enabled before presettable counter 142 can count down to its reset position from its maximum initial value. This allows maximum power of the first polarity to be applied to the loop circuit.

The presettable counter 142 is only initialized once for a selected power level since the power applied to the load circuit is a function of the time between enable signal EN1 and reset signal RST. Since the presettable counter 142 is loaded during enable signal EN1, the initialization value determines a skew between the reset pulse RST and the enable signal EN1. This skew will remain constant since both the address counter 130 and presettable counter are both driven by clock circuit 120.

Figure 4:
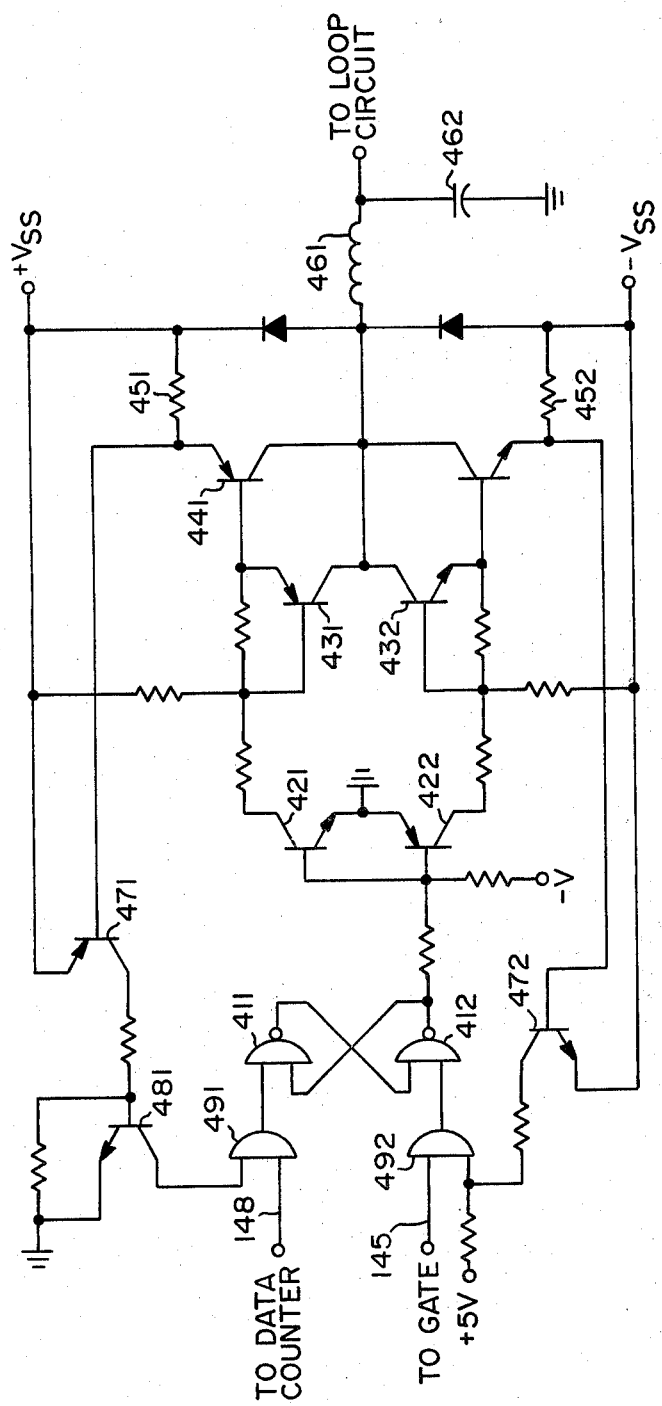
FIG. 4 is a modification of the circuit of FIG. 2 which provides for active current limiting.

Passive current limiting is provided by the circuitry of power switch 144 as shown in FIG. 3, and active current limiting is provided by the circuitry of power switch 144, as shown in FIG. 4. Enable signal EN1 generated by gate 143 is a pulse derived from address signals generated by address counter 130. Utilizing the circuitry of FIG. 3 a latch comprising gates 311 and 312 stores the enable signal pulse and the resulting logic level "1" at the output of gate 312 is converted to a high voltage signal by a high voltage interface circuit consisting of transistors 321 through 332 and their associated biasing resistors.

This interface circuit then turns on high voltage switching transistor 341. The current through this transistor is passively limited by resistor 351. This first polarity of power is applied to choke 361 until data counter 142 generates a reset signal RST which resets the latch comprising gates 311 and 312. The resulting logic level "0" at the output of gate 312 is converted to a high voltage signal which turns on high voltage switching transistor 342 and turns off transistor 341. The current through transistor 342 is passively limited by resistor 352. The duration of the two polarities of power generated by transistors 341 and 342 are averaged by a filter circuit consisting of choke 361 and capacitor 362 to apply the resulting average magnitude of power to the loop circuit.

The use of active current limiting is facilitated by the circuitry shown in FIG. 4. The circuitry of FIG. 4 is identical to that shown in FIG. 3 with the addition transistors 471 through 481 and their associated biasing resistors, and gates 491 and 492. Transistors 471 and 472 detect current flow through resistors 451 and 452 and operate through gates 491 and 492 to switch the latch to its opposite state when the current threshold is reached.

The programmable power supply system of the present invention, FIGS. 1 through 4, provide processor control of the power applied to a telephone subscribers loop circuit and eliminate the need for a wide variety of power supplies to meet the range of power requirements of each loop circuit.

It will be obvious to those skilled in the art that numerous modifications of the present invention can be made without departing from the spirit of the invention which shall be limited only by the scope of the claims appended hereto.

What is claimed is:

1. A programmable power supply system for use in a digital telecommunication switching system, including a processing unit periodically operated to generate at least one loading signal and digital data representative of a selected voltage to be applied to a selected telecommunication loop circuit, said programmable power supply system comprising:

pulsing means periodically operated to generate a plurality of clock pulses;

addressing means connected to said pulsing means operated in response to said clock pulses to generate at least one address signal;

decoding means connected to said addressing means operated in response to said address signal and said loading signal to generate at least one data transfer signal;

counting means connected to said processing unit, to said pulsing means and to said addressing means operated in response to said data transfer equal to accept said digital data from said processing unit and further operated in response to a predetermined number of said clock pulses to count down from an initial count represented by said digital data to a reset position and generate a reset signal;

storage means connected to said counting means and to said addressing means operated to initiate generation of a power control signal in response to said address signal and further operated to terminate generation of said power control signal in response to said reset signal; and power switching means connected between said selected telecommunication loop circuit and said storage means, operated to generate power of a first characteristic in response to said power control signal and to generate power of a second characteristic in response to an absence of said power control signal and further operated to apply power equivalent to an average of said first and second characteristics, to said telecommunication loop circuit.

2. A programmable power supply as claimed in claim 1, wherein: said addressing means operated in response to said clock pulses to generate a plurality of address signals; and said decoding means operated in response to a predetermined combination of said address signals and said loading signal to generate at least one data transfer signal.

3. A programmable power supply as claimed in claim 1, wherein: said storage means comprise at least one RS flip-flop.

4. A programmable power supply as claimed in claim 1, wherein: said first counting means comprise at least one presettable N-bit counter.

5. A programmable power supply as claimed in claim 1, wherein: said addressing means comprise an M-bit counter.

6. A programmable power supply as claimed in claim 1, wherein: said power switching means comprise control means connected to said storage means operated in response to said power control signal to generate power of said first characteristic for the duration of said power control signal and operated in response to an absence of said power control signal to generate power of said second characteristic for the duration of the absence of said power control signal; and averaging means connected to said switching control means operated in response to power of said first and second characteristics to apply power equivalent to the average of said first and second characteristics, to said telecommunication loop circuit.

7. A programmable power supply as claimed in claim 6, wherein; there is further included first and second power sources, said control means comprise:

an interface circuit connected to said storage means operated in response to said power control signal to generate a power enable signal of a first characteristic and operated in response to an absence of said power control signal to generate a power enable signal of a second characteristic;

first and second switching means connected to first and second power sources respectively, to said averaging means and to said interface circuit; said first switching means operated in response to said power enable signal of said first characteristic to connect power of a first characteristic from said first power source to said averaging means and said second switching means operated in response to said power enable signal of said second characteristic to connect power of said second characteristic from said second power source to said averaging means.

8. A programmable power supply as claimed in claim 7, wherein: said averaging means comprise a filter connected between said telecommunication loop circuit and said first and second switching means, operated in response to said first and second characteristic of power to supply power equivalent to the average of said first and second characteristics to said telecommunication loop circuit.

9. A programmable power supply as claimed in claim 7, wherein: said switching control means comprise passive current limiting means.

10. A programmable power supply as claimed in claim 7, wherein: said switching control means comprise active current limiting means.

* * * * *